United States Patent
Wang et al.

(10) Patent No.: US 8,532,421 B2
(45) Date of Patent: Sep. 10, 2013

(54) METHODS AND APPARATUS FOR DE-BLURRING IMAGES USING LUCKY FRAMES

(75) Inventors: Jue Wang, Kenmore, WA (US); David P. Simons, Seattle, WA (US); Seungyong Lee, Pohang (KR); Sunghyun Cho, Pohang (KR)

(73) Assignee: Adobe Systems Incorporated, San Jose, CA (US)

( * ) Notice: Subject to any disclaimer, the term of this patent is extended or adjusted under 35 U.S.C. 154(b) by 378 days.

(21) Appl. No.: 12/957,298

(22) Filed: Nov. 30, 2010

(65) Prior Publication Data
US 2012/0121202 A1 May 17, 2012

Related U.S. Application Data

(60) Provisional application No. 61/413,343, filed on Nov. 12, 2010.

(51) Int. Cl.
G06K 9/40 (2006.01)

(52) U.S. Cl.
USPC .......................................................... 382/255

(58) Field of Classification Search
None
See application file for complete search history.

(56) References Cited

U.S. PATENT DOCUMENTS

| 7,728,909 | B2 * | 6/2010 | Poon | 348/451 |
| 8,238,694 | B2 * | 8/2012 | Sun et al. | 382/294 |
| 8,390,704 | B2 * | 3/2013 | Wang et al. | 348/248 |
| 2007/0009169 | A1 | 1/2007 | Bhattacharjya | |
| 2007/0248243 | A1 * | 10/2007 | Ko et al. | 382/103 |
| 2009/0179995 | A1 | 7/2009 | Fukumoto et al. | |
| 2009/0213234 | A1 | 8/2009 | Chen et al. | |

FOREIGN PATENT DOCUMENTS

GB 2485478 5/2012

OTHER PUBLICATIONS

Dai and Wu, "Motion from Blur," Computer Vision and Pattern Recognition, IEEE CVPR 2008.*
Huang et al., "Image deblurring with Blur Kernel Estimation from a Reference Image Patch," Pattern Recogntion, IEEE ICPR 2008.*
Bornard et al., "Missing Data Correction in Still images and Image Sequences," ACM, 2002.*
Cho et al., "Removing Non-uniform Motion Blur from Images," IEEE ICCV 2007.*
Sorel and Sroubek, "Space-variant Deblurring Using One Blurred and One Underexposed Image," IEEE ICIP 2009.*
Yuan et al., "Image Deblurring with Blurred/Noisy Image Pairs," ACM Transactions on Graphics, vol. 26, No. 3, 2007.*
Cho and Lee, "Fast Motion Deblurring," ACM Transactions on Graphics, vol. 28, No. 5, 2009.*
Cho et al., "Video Deblurring for Hand-held Cameras Using Patch-based Synthesis," ACM Transactions on Graphics, 2012.*

(Continued)

*Primary Examiner* — Barry Drennan
*Assistant Examiner* — Andrew Moyer
(74) *Attorney, Agent, or Firm* — Wolfe-SBMC

(57) ABSTRACT

A sharp frame and a blurred frame are detected from among a plurality of frames. A blur kernel is estimated. The blur kernel represents a motion-transform between the sharp frame and the blurred frame. Using the blur kernel, a static region measure for the sharp frame and the blurred frame is estimated. A de-blurred frame is generated by replacing one or more pixels of the blurred frame as indicated by the static region measure.

17 Claims, 10 Drawing Sheets

(56) References Cited

OTHER PUBLICATIONS

Search and Examination Report from the Intellectual Property Office, Application No. GB1119455.2, dated Mar. 5, 2012, Jue Wang, et al., 4 pages.

Vile Ojansivu, et al., "Motion Blue Concealment of Digital Video Using Invariant Features," 2006, Advanced Concepts for Intelligent vision Systems 8th International Conference, ACIVS 2006 Proceedings (Lecture Notes in Computer Science vol. 4179), pp. 35-45, ISBN: 3-540-44630-3, See especially Section 3.

* cited by examiner

METHODS AND APPARATUS FOR DE-BLURRING IMAGES USING LUCKY FRAMES

This application claims benefit of priority to U.S. Provisional Application Ser. No. 61/413,343, which was filed on Nov. 12, 2010.

BACKGROUND

Description of the Related Art

The recent profusion of inexpensive digital video cameras has enabled the creation of a much broader universe of digital video content. New market entrants are now able to bring video recording to environments and events for which recording was previously considered cost-prohibitive or technically unfeasible. Many of the environments or events for which recording was previously considered cost-prohibitive or technically unfeasible involve situations that are highly dynamic and lead to the creation of video with cameras that are being moved during recording with motion patterns that are not easily predicted or arranged in advance.

To increase the ability to generate video output of acceptable quality in spite of the fact that a camera is moving during recording, many techniques for implementing motion compensation features have been developed. These techniques for implementing motion compensation features give the appearance of having "stabilized" the video recorded by the camera by adjusting the recorded output of the camera to reduce the visible appearance of camera motion, where possible.

At the individual frame level, however, currently available motion compensation techniques do not eliminate blurred frames in a video data stream. Such blurred frames continue to exhibit motion blur artifacts, which can become more noticeable when video is stabilized and can distract from the intended purpose of the video that was recorded. In a blurred video frame, edges of objects appear visually indefinite and the blurring of the image generally distracts from the ability to absorb information from the image.

SUMMARY

Various embodiments of methods and apparatus for deblurring images are disclosed. A sharp frame and a blurred frame are detected from among a plurality of frames. A blur kernel is estimated. The blur kernel represents a motion-transform between the sharp frame and the blurred frame. Using the blur kernel, a static region measure for the sharp frame and the blurred frame is estimated. A de-blurred frame is generated by replacing one or more pixels of the blurred frame as indicated by the static region measure.

Figure 1:
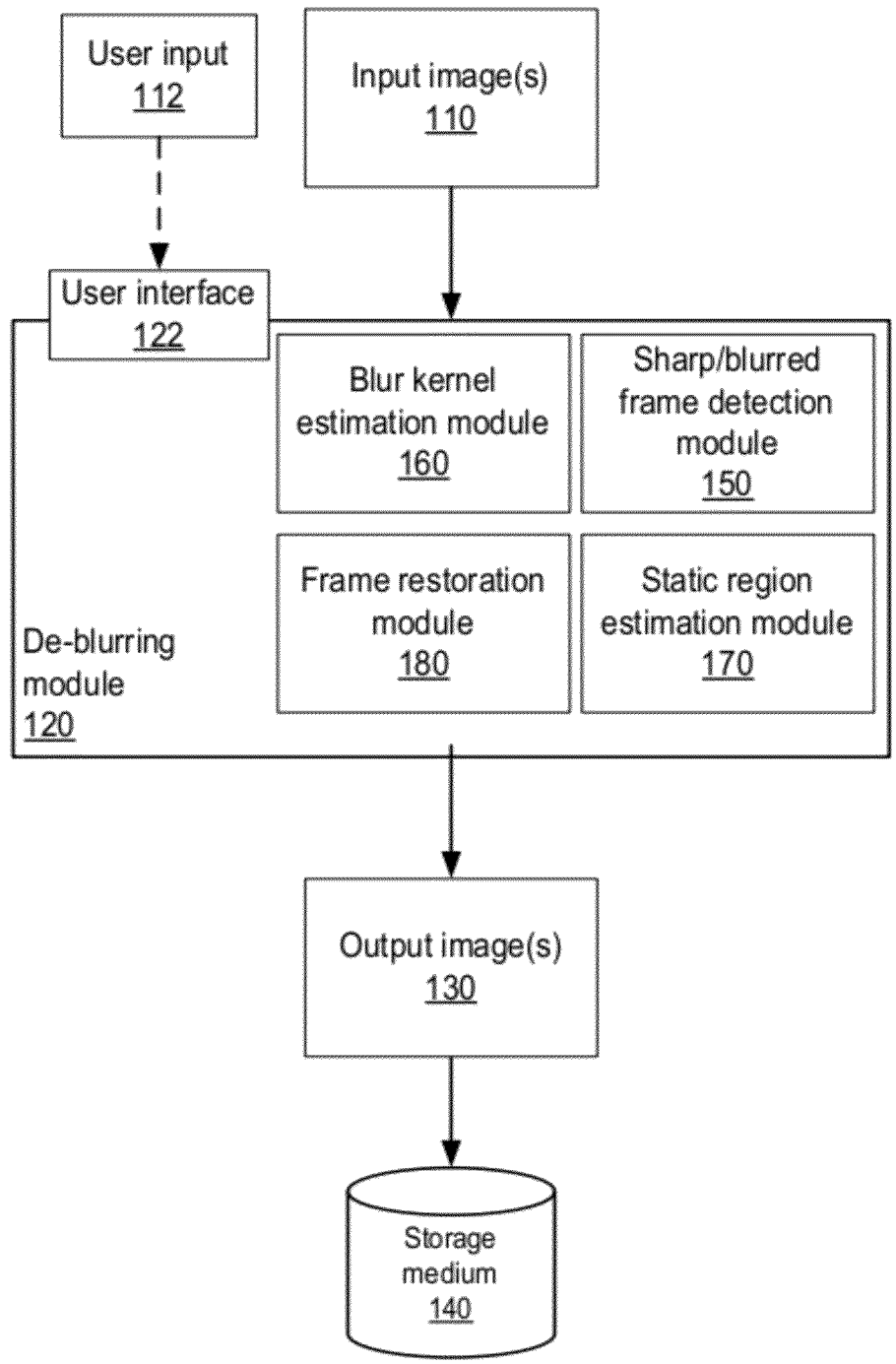
FIG. 1 depicts a module that may implement de-blurring of images according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to De-Blurring of Images Using Lucky Frames

Embodiments of an automated procedure for removing motion blur from blurred video frames, such as video frames from video streams captured by cameras in motion during recording, are disclosed. Within a group of frames from a video stream, a sharp frame and a blurred frame are identified and selected from among a plurality of frames. In some embodiments, for each blurred frame a sharp frame occurring before the blurred frame and a second sharp frame occurring after the blurred frame are identified. A blur kernel is estimated. The blur kernel is a point spread function describing camera motion during the exposure time of the blurred frame. If the sharp frame and the blurred frame contain the same static region, it also represents a motion-transform between these two regions. Using the blur kernel, a static region measure, also called a static region mask, for the sharp frame and the blurred frame is calculated. In some embodiments, static region masks are calculated for the blurred image with respect to both the sharp frame and the second sharp frame. A de-blurred frame is generated by replacing pixels of the blurred frame as indicated by the static region mask.

Video captured by hand-held cameras often suffers from motion artifacts due to camera motion. While motion artifacts can be reduced through a process of video stabilization, the stabilization process leaves blurred frames that can distract from the value of the video that has been captured and stabilized. Embodiments of the de-blurring module discussed below suppress blurriness in video frames, such that the resulting video frames appear more uniformly sharp. In a video sequence captured by a handheld camera that is in motion, not all frames will be equally blurred. There will be sharper frames that periodically appear in the video stream, at intervals frequently on the order of one in every fifteen frames. These less-blurred frames exist because the video frames are blurred by camera motion, and the camera motion is highly irregular. As the camera is panning from one direction to another, there is frequently a short duration between the two movements that the absolute speed of the camera is close to zero. The frames captured in this short duration are, compared to other frames in the same video stream, relatively sharp. Embodiments described below first identify sharper frames for use as a reference. Then, for a blurred frame, embodiments described below locate a nearby sharp frame or multiple nearby sharp frames, align the two or more frames together using image registration, and, for common regions that the two or more frames share, replace pixels from the blurred frames with either pixels from a sharp frame or composites of pixels from multiple sharp frames.

Example Embodiment

FIG. 1 illustrates a de-blurring module that may implement one or more of the de-blurring image editing techniques and tools illustrated in FIG. 1 through 7. De-blurring module 120 may, for example, implement one or more of deblurring image pairs and deblurring frame sequences from a video stream. FIG. 8 illustrates an example computer system on which embodiments of de-blurring module 120 may be implemented. Deblurring module 120 receives as input one or more input images 110. Example images are shown in FIG. 2A-2B. Deblurring module 120 may receive user input 112 activating a deblurring image editing tool. Deblurring module 120 then edits the input images 110, according to user input 112 received via user interface 122, using the pixels extracted from a sharp image (or composites of pixels extracted from multiple sharp images) and estimates of static regions shared between a blurred image and a sharp image or multiple sharp images from among input images 110. Module 120 generates as output one or more output images 130. Output image(s) 130 may, for example, be stored to a storage medium 140, such as system memory, a disk drive, DVD, CD, etc.

In some embodiments, deblurring module 120 may provide a user interface 122 via which a user may interact with the deblurring module 120, for example to activate a deblurring image editing tool. In some embodiments, the user interface may provide user interface elements whereby the user may select options including, but not limited to, deblurring individual images or whole video streams. In some embodiments, the user interface may provide user interface elements whereby the user may specify options such as pixel sampling or compositing parameters. In some embodiments, the user interface may provide user interface elements whereby the user may specify which layers data is to be sampled from and/or painted to.

Deblurring module 120 contains a sharp/blurred frame detection module 150 for detecting sharp and blurred frames. An example sharp frame is discussed below with respect to FIG. 2A. An example blurred frame is discussed below with respect to FIG. 2B. An example of feature point detection is explained with respect to FIG. 2C. Sharp and blurred frames can be detected by identifying, tracking, and calculating the movements of feature points that may be automatically detected and tracked between frames by sharp/blurred frame detection module 150. A blur kernel estimation module 160 estimates a blur kernel representing movement (also called a motion transform) between a sharp frame and a blurred frame. An example of a blur kernel is discussed below with respect to FIG. 3. A static region estimation module 170 performs the estimation of regions of pixels that remain constant between a blurred frame and one or more sharp frames and generates a static region mask, or other static region measure, indicating static regions shared between a blurred frame and a sharp frame. As used herein, a static region measure is a data structure for indicating the similarity between the values of corresponding pixel, locations in a pair of frames. A frame restoration module 180 generates a de-blurred frame by replacing pixels from the blurred frame with pixels from the sharp frame or composites of pixels from multiple sharp frames according to the indications of shared regions contained in the static region mask.

Figure 2A:
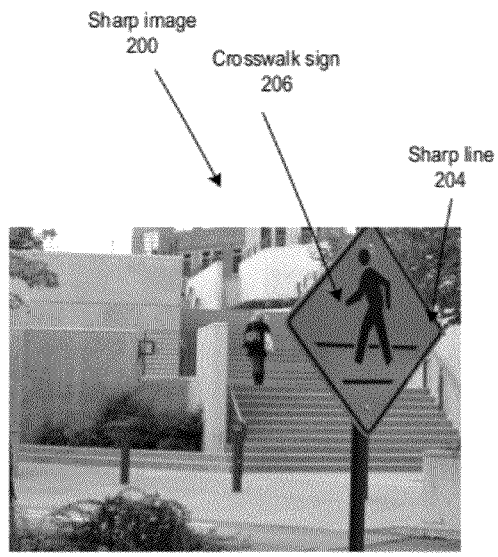
FIG. 2A illustrates a sharp frame usable to implement de-blurring of images according to some embodiments.

FIG. 2A illustrates a sharp frame usable to implement de-blurring of images according to some embodiments. In sharp image 200, a series of crisp details may be observed. An example of a sharp detail is sharp line 204 of crosswalk sign 206. Edges of objects appear visually definite.

Figure 2B:
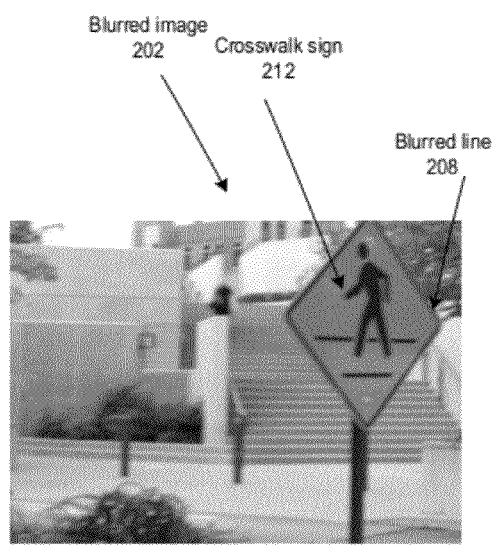
FIG. 2B depicts a blurred frame usable to implement de-blurring of images according to some embodiments.

FIG. 2B depicts a blurred frame usable to implement de-blurring of images according to some embodiments. In blurred frame 202, a series of blurred details may be observed. An example of such a blurred detail is blurred line 208 of crosswalk sign 212. Edges of objects appear visually indefinite and the blurring of the image generally distracts from the ability to absorb information from the image.

Figure 2C:
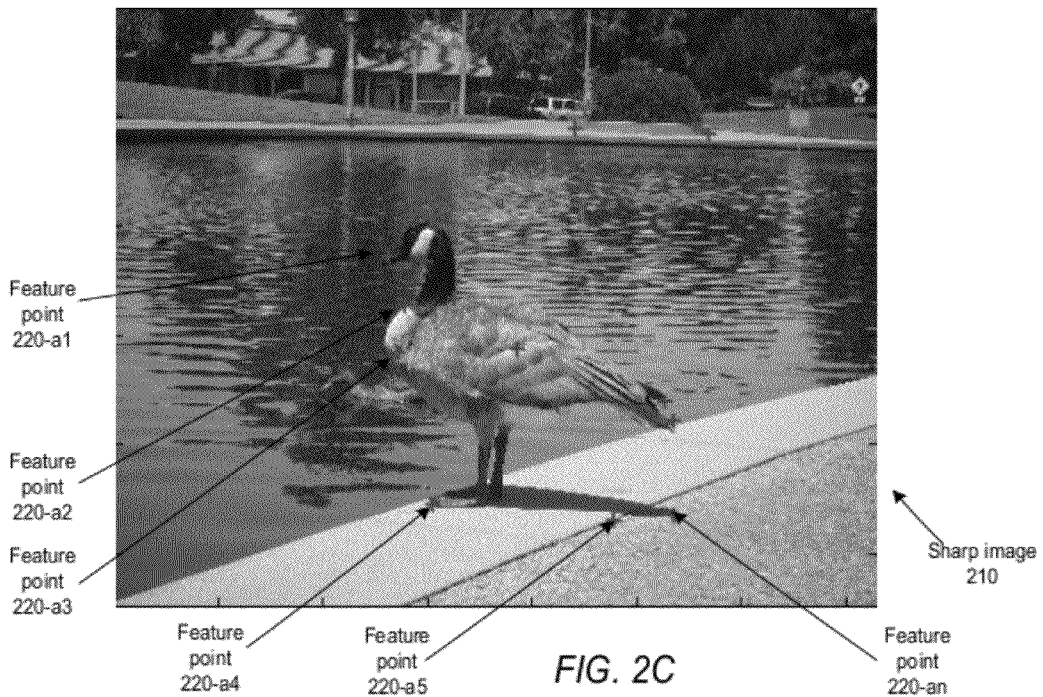
FIG. 2C illustrates a feature point identification usable to de-blurring of images according to some embodiments.

FIG. 2C illustrates a feature point identification usable to de-blurring of images according to some embodiments. Feature points 220a1-220an represent machine-detectable regions of pixel discontinuity in sharp image 210. For example, feature point 220a3 represents a transition from pixels in a green color range to pixels in a grey color range and a black color range. In one embodiment, detecting sharp frame 210 as being a sharp frame includes detecting a set of feature points in a first frame (not shown), and tracking the set of feature points in a second frame (e.g., sharp frame 210). Motion of the set of feature points between the first frame and the second frame is calculated. Sharp frame 210 is identified as a sharp if the motion of the set of feature points between the first frame and the second frame is less than a threshold value.

One skilled in the art will readily ascertain in light of having read the present disclosure that embodiments using more than two frames are possible and fall within the scope and intent of the present disclosure. In such alternative embodiments, camera speed can also be estimated, and estimated camera position for a time T−1 can be subtracted from a position at T+1 to support analysis of an absolute value of the change in position.

Deblurring Techniques

Given an input video sequence composed of a set of frames, embodiments first detect sharp frames. Then, the remaining frames, which are not detected as sharp frames, are assumed, in some embodiments, to be blurred frames. For each blurred frame, embodiments estimate how the frame is blurred, i.e., the motion creating the blur, by estimating the frame's blur kernel. By using the estimated blur kernel, embodiments remove motion blur from the blurred frame in two steps. First, for each blurred frame, embodiments find two neighboring sharp frames. Then, embodiments blur the two sharp frames using an estimated blur kernel of the target blurred frame, and compare the resulting blurred images with the target blurred frame. In some embodiments, for each of the sharp frames, the blur kernel is estimated and shared static regions are detected, independently from other sharp frame. In such embodiments, the blur kernel and the static regions are not shared by the two sharp frames (before and after the blurred frame). As will be apparent to one skilled in the art upon reviewing equation (2) below, blur kernel estimation employs a sharp frame in the optimization. Some embodiments using two sharp frames estimate two blur kernels, each associated with one sharp frame to accommodate any slight difference in the two blur kernels, due to image noise, errors in alignment, etc. In some embodiments, embodiments find the static regions that are shared by all three images, and motion objects (i.e., areas of motion in the frame) can be detected as well. A data structure representing these static regions, called a static region mask, is constructed. Finally, embodiments generate a de-blurred frame by replacing pixels from the blurred frame with composites of the pixels from the sharp frames to remove the motion blur caused by camera motion on the blurred frame.

Figure 3A:
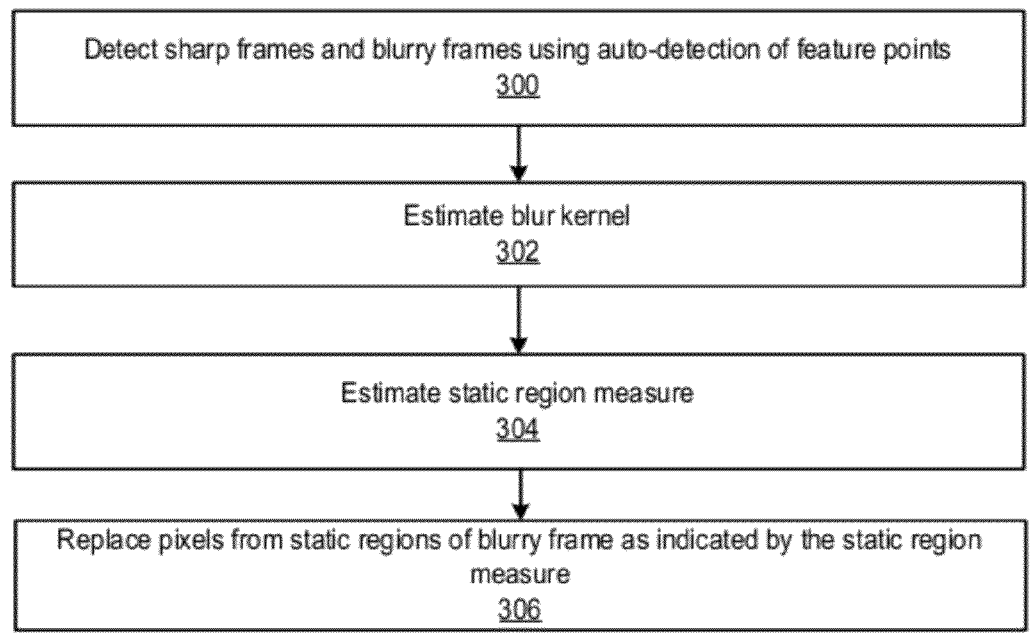
FIG. 3A is a high-level logical flowchart of operations that may be performed in de-blurring of images according to some embodiments.

FIG. 3A is a high-level logical flowchart of operations that may be performed in de-blurring of images according to some embodiments. Sharp frames and blurred frames are detected using auto-detection of feature points (300). Operations for detecting sharp frames are discussed further with respect to FIG. 3C, below. Generally speaking, a sharp frame is captured under insignificant camera motion. Embodiments track feature points across adjacent frames, and estimate a camera motion (e.g., homography) between frames based on the displacements of feature points. In some embodiments, a content-preserving warp is also used. If the computed camera motion is less than a threshold, then the frames are identified as sharp frames. If the camera motion is greater than the threshold, the frame is designated as blurred. In some embodiments, the threshold is adjustable. In other embodiments, a first threshold is used for designating a frame as sharp and a second threshold is used for designating a frame as blurred.

A blur kernel is estimated (302). For each blurred frame, embodiments find a corresponding sharp frame, which is temporally nearest to the target blurred frame. For the common region of the two frames, the following relation below holds:

$$B(x) = K * S(x) \tag{1}$$

where B is a blurred frame, S is a sharp frame, which is aligned to B using the homography, which is estimated in the previous step, and K is the estimated blur kernel of B. x is a 2D vector for a pixel position. Then, for a common region of S and B, embodiments calculate the blur kernel K by solving $$\underset{K}{\operatorname{argmin}} \sum_x w(x) |B(x) - K * S(x)|^2 + \lambda \rho(K) \tag{2}$$

where the left term is for data fitting, and ρ(K) is a regularization function for regularizing the least square solution. For example, some embodiments use a Tikhonov regularization, in which $$\rho(K) = \sum_x |K(x)|^2.$$

w(x) is a weighting function, which gives high values for pixels in the common regions, and λ is the regularization strength.

w(x) can be computed as follows:

$$w(x) = \frac{N(B(x) \mid K * S(x), \sigma^2) b}{N(B(x) \mid K * S(x), \sigma^2) b + (1-b)} \tag{2}$$

where $N(B(x)|K*S(x),\sigma^2)$ is a normal distribution whose mean is $K*S(x)$ and variance is $\sigma^2$. b is a constant which, in some embodiments is set to 0.5. Because the exact value for K is unknown and is subject to estimate, embodiments alternatingly compute w(x) and find K by solving Eq.

Static region measures are estimated (304). In some embodiments, static region measures, such as a static region mask, are identified or estimated by identifying areas of motion between the sharp frame and the blurred frame by comparing the blurred frame to a simulated blurred frame generated as a product of the sharp frame and the blur kernel. For finding the static regions on a blurred frame, embodiments first find the temporally nearest sharp frames to the current target blurred frame. Embodiments find two nearest sharp frames, where one is situated prior to the target blurred frame and the other is situated after the target blurred frame.

For each pair of a sharp frame and the target blurred frame, embodiments estimate their common static regions separately. More specifically, embodiments estimate α(x) for each pixel x, which is a confidence value for the static regions. When a pixel x corresponds to a static region, α(x) should be close to one, and otherwise, α(x) is close to zero. For estimating α(x), embodiments optimize the following energy function with respect to α.

$$B(\alpha) = \sum_x d(x)\alpha^2(x) + \beta \sum_x |1 - \alpha(x)|^2 + \gamma S(\alpha) \qquad (3)$$

where d(x) is a weighting function, which gives a large penalty for pixels where K*S(x) and B(x) are different to each other, i.e., non-static regions. The second term on the right hand side of the equation encourages solutions in which α(x) is closer to 1, such that embodiments can copy as many as possible sharp pixels to the blurred frame. S(α) is a function, which encourages the resulting α(x) to exhibit spatially smooth transitions in order to avoid discontinuities caused by sudden changes of α in the resulting deblurred frame. Embodiments use $$S(\alpha) = \sum_x |\partial_x \alpha(x)|^2 + \sum_x |\partial_y \alpha(x)|^2$$

where $\partial_x$ and $\partial_y$ are x- and y-directional gradient operators. β and γ are relative weights for each term.

d(x) is defined as $$d(x) = a(x)|1 - SSIM(K*S(x), B(x))|^2 \qquad (4)$$

where SSIM(K*S(x),B(x)) is a structure similarity measurement, which is a method for measuring the similarity between two image patches centered at x. SIMM(K*S(x),B(x)) is defined by the equation:

$$SSIM(A(x), B(x)) = \frac{(2\mu_{A(x)}\mu_{B(x)} + c_1)(2\sigma_{A(x)B(x)} + c_2)}{(\mu_{A(x)}^2 + \mu_{B(x)}^2 + c_1)(\sigma_{A(x)}^2 + \sigma_{B(x)}^2 + c_2)} \qquad (5)$$

where $\mu_{A(x)}$ and $\sigma_{A(x)}^2$ are the average intensity and the variance of intensities of a patch in an image A centered at pixel x. $\mu_{B(x)}$ and $\sigma_{B(x)}^2$ are the average intensity and the variance defined on a patch of an image B centered at pixel x. $\sigma_{A(x)B(x)}$ is the covariance of patches of A and B. $c_1$ and $c_2$ are small positive values for stabilizing the division operation. Typically, a Gaussian window, whose size is 11×11 (pixels) with standard deviation of 1.5, is used for defining patches. Structural similarity calculations are discussed in greater detail at Wang, Z., A. C. Bovik, H. R. Sheikh, and E. P. Simoncelli. "Image quality assessment: From error visibility to structural similarity." *IEEE Transactions on Image Processing* 13, no. 4 (April 2004): 600-612.

s(x) is a weighting function for saturated pixels. Because saturated pixels, which are caused when the incident light exceeds the capacity of the camera sensors, break the linearity of a motion blur, robust measurement of the structural similarity on saturated pixels is difficult. Thus, embodiments give lower weights to the SSIM values on saturated pixels. To compute s(x), embodiments first find saturated regions on the sharp frame S by computing $$s'_A(x) = \exp\left(-\frac{|S(x) - 255|^2}{2\sigma_s^2}\right) \qquad (7)$$

where $\sigma_s^2$ is the user-controlled parameter for the intensity range of the saturated pixels. The range of intensity S(x) is [0,255]. Then, embodiments dilate s'(x) with the estimated motion blur kernel of the blurred frame B and dilate the result further with a small disk-shaped filter for covering the neighboring pixels, and generate the resulting map $s_A$. For the blurred frame B, embodiments again compute $s'_B$ similarly to Eq. (7). Embodiments dilate $s'_B$ similarly to $s'_A$, and get $s_B'$ Then, embodiments compute SW as $$s(x) = (1 - s_A(x))(1 - s_B(x)) \qquad (8)$$

Pixels from static regions of the blurred frame are then replaced as indicated by the static region measure (306). In one embodiment, replacing pixels of the blurred frame further includes calculating a replacement pixel as a composite of a first pixel from the first sharp frame and a second pixel from a second sharp frame. The first sharp frame is a frame occurring prior to the blurred frame in the video stream and the second sharp frame is a frame occurring after the blurred frame.

After estimating the α maps of each pair of sharp and blurred frames, embodiments restore sharp frames using the estimated two α maps and the two sharp frames. In some embodiments, identifying a static region measure such as an a map includes calculating a value of the static region measure for a pixel location such that the value is inversely correlated to a change of a status of the pixel location between the first frame and the second frame. Such a calculation may include calculating a value of an energy minimization function including a regularization term and a structural similarity term, as described above.

In order to distinguish the two α maps, they are hereafter designated as $\alpha_1$ and $\alpha_2$. Sharp frames are designated as $S_1$ and $S_2$. For restoration, embodiments compute new maps $\alpha_1'$ and $\alpha_2'$ from $\alpha_1$ and $\alpha_2$ as follows:

$$\alpha_1'(x) = a(x)\frac{\alpha_1(x)}{\alpha_1(x) + \alpha_2(x)}, \qquad (9)$$

$$\alpha_2'(x) = a(x)\frac{\alpha_2(x)}{\alpha_1(x) + \alpha_2(x)}$$

where $a(x) = \max(\alpha_1(x), \alpha_2(x))$. Embodiments compute the final deblurred frame as $$R(x) = \alpha_1'(x)S_1(x) + \alpha_2'(x)S_2(x) + (1 - \alpha_1'(x) - \alpha_2'(x))B(x). \qquad (10)$$

$\alpha_1'$ and $\alpha_2'$ have following properties: 1) the sum of $\alpha_1'$ and $\alpha_2'$ does not exceed one, so the weight $(1 - \alpha_1'(x) - \alpha_2'(x))$ cannot be negative, and 2) when at least either one of $\alpha_1'$ and $\alpha_2'$ are close to one, the resulting R will not use B, so the resulting frame R can be as sharp as possible.

Figure 3B:
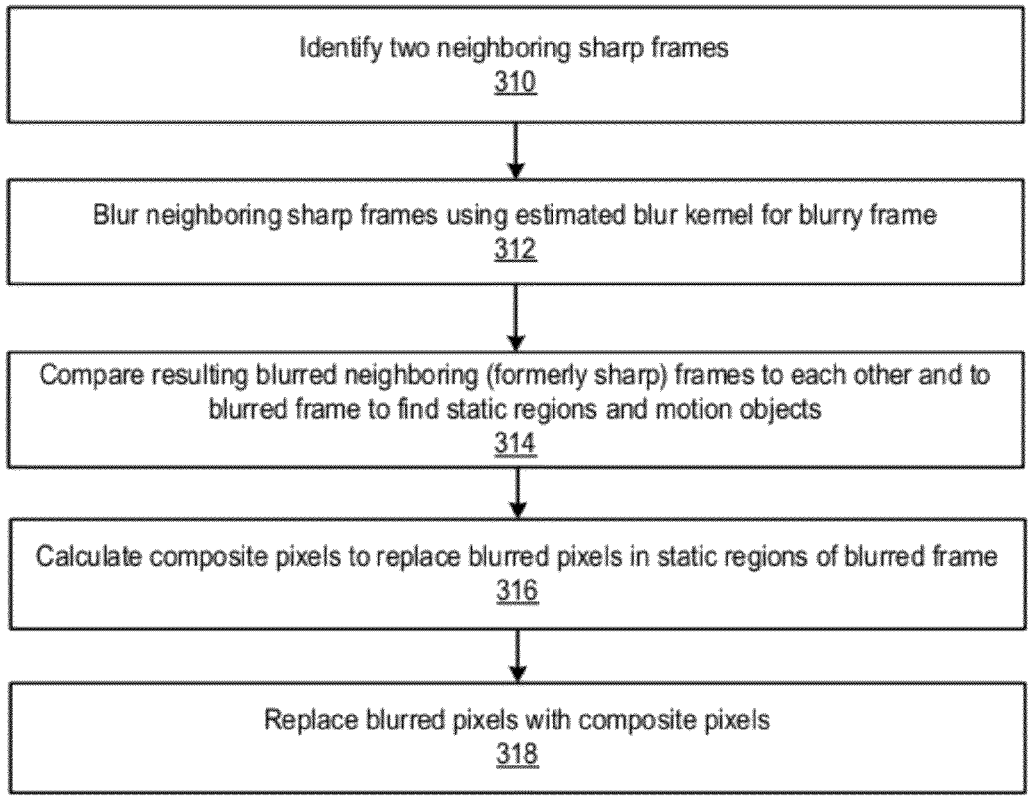
FIG. 3B is a high-level logical flowchart of pixel replacement operations that may be performed in de-blurring of images according to some embodiments.

FIG. 3B is a high-level logical flowchart of pixel replacement operations that may be performed in de-blurring of images according to some embodiments. Two sharp frames neighboring a blurred frame are identified (310). The neighboring sharp frames are blurred using a blur kernel for the blurred frame (312). The resulting blurred neighboring (formerly sharp) frames are compared to each other and to the blurred frames to find static regions and motion objects (314). This comparison is represented as a static region mask. Composite pixels are calculated for use to replace blurred pixels in static regions of the blurred frame (316). Blurred pixels are replaced with composite pixels (318) as indicated by the static region mask.

Figure 3C:
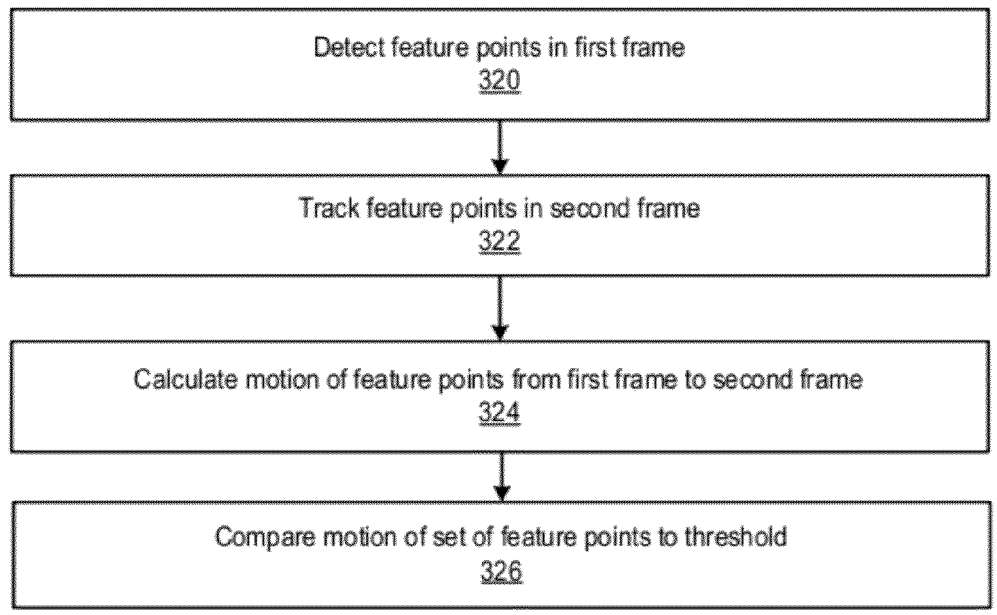
FIG. 3C is a high-level logical flowchart of sharp frame detection operations that may be performed in de-blurring of images according to some embodiments.

FIG. 3C is a high-level logical flowchart of sharp frame detection operations that may be performed in de-blurring of images according to some embodiments. Feature points are detected in a first frame (320). The feature points are tracked in a second frame (322). The motion of the set of feature points from the first frame to the second frame is calculated (324). In some embodiments, calculating the motion of the set of feature points between the first frame and the second frame includes estimating a homography based on a displacement of the set of feature points between the first frame and the second frame. The homography is later usable to estimate a blur kernel based on an alignment between the sharp frame and the blurred frame based on the homography. The motion of the set of the feature points is compared to a threshold (326).

Figure 4:
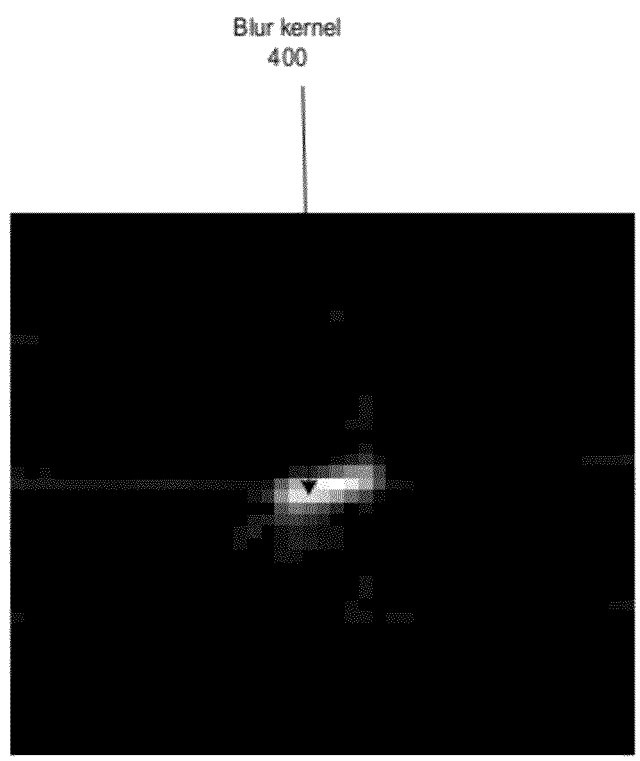
FIG. 4 illustrates a blur kernel usable to implement de-blurring of images according to some embodiments.

FIG. 4 illustrates a blur kernel usable to implement de-blurring of images according to some embodiments. Blur kernel 400 is a bitmap representing an estimate of the motion transform existing between a sharp frame and a blurred frame, also understood as the motion undertaken by a sharp image to reach the position of a blurred image as calculated in block 302, discussed above.

Figures 5A, 5B:
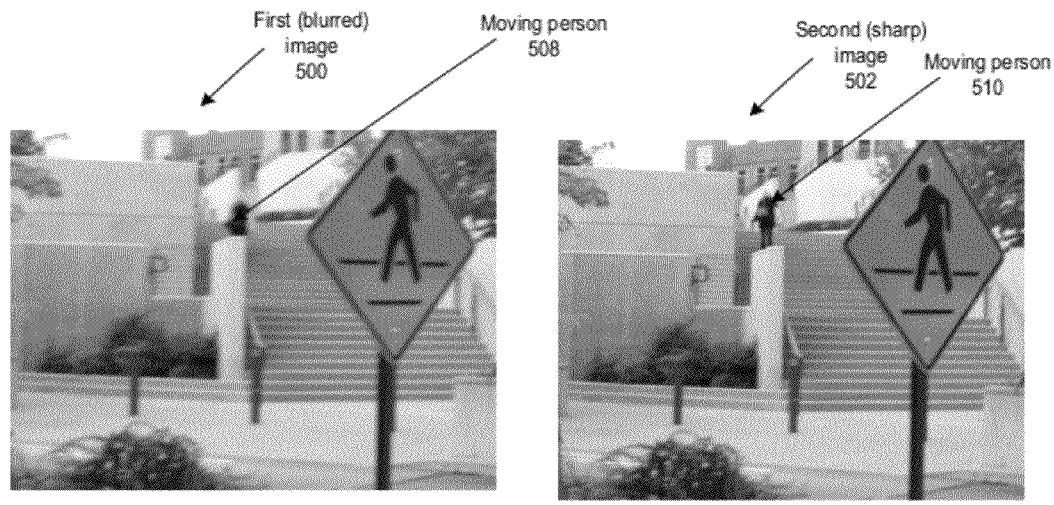
FIG. 5A illustrates a first (blurred) frame usable to implement de-blurring of images according to some embodiments.
FIG. 5B illustrates a second (sharp) frame usable to implement de-blurring of images according to some embodiments.

FIG. 5A illustrates a first (blurred) frame usable to implement de-blurring of images according to some embodiments. A moving person 508 is indicated in an otherwise largely static image 500. Because the moving person is moving between frames, embodiments tend not to replace pixels representing the moving person. Such pixels will exhibit low $\alpha$ scores representing low static region correspondence and static region measures such as static region masks will indicate exclusion of moving person 508 from pixel replacement operations.

FIG. 5B illustrates a second (sharp) frame usable to implement de-blurring of images according to some embodiments. A moving person 510 is indicated in an otherwise largely static second (sharp) image 502. The sharpness of detail visible in image 502 is materially superior to that present in image 500 of FIG. 5A, indicating that substantial opportunity for pixel replacement can be exploited by embodiments.

Figures 5C, 5D:
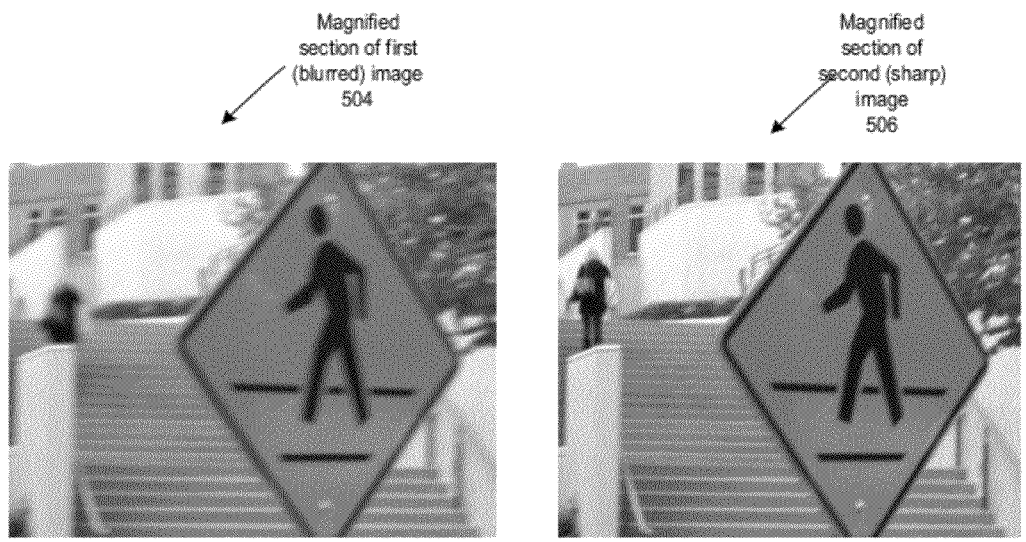
FIG. 5C illustrates a magnified section of a first (blurred) frame usable to implement de-blurring of images according to some embodiments.
FIG. 5D illustrates a magnified section of a second (sharp) frame usable to implement de-blurring of images according to some embodiments.

FIG. 5C illustrates a magnified section of a first (blurred) frame usable to implement de-blurring of images according to some embodiments. Magnified section of first (blurred) image 504 is provided to call attention to the blurring effect.

FIG. 5D illustrates a magnified section of a second (sharp) frame usable to implement de-blurring of images according to some embodiments. Magnified section of second (sharp) image 506 is provided to call attention to the sharpness of detail.

Figure 6A:
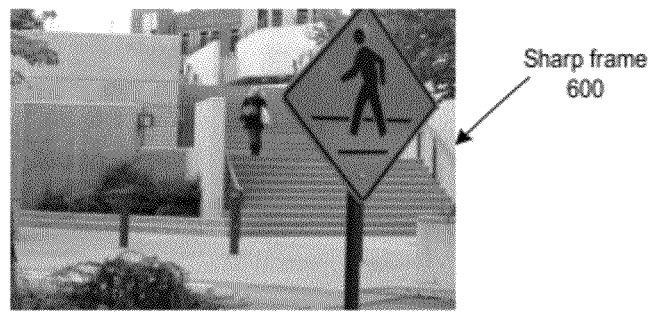
FIG. 6A illustrates a first (sharp) frame usable to implement de-blurring of images according to some embodiments.

FIG. 6A illustrates a first (sharp) frame usable to implement de-blurring of images according to some embodiments. A sharp frame 600 is provided.

Figure 6B:
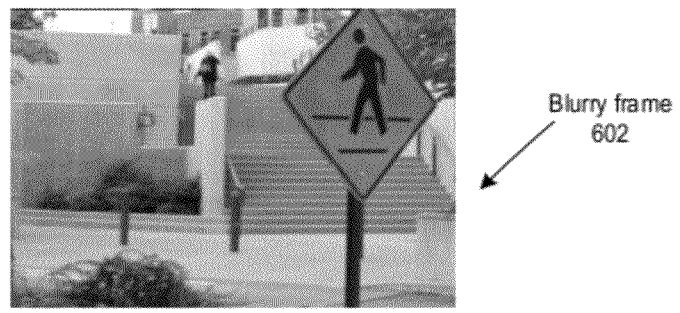
FIG. 6B illustrates a second (blurred) frame usable to implement de-blurring of images according to some embodiments.

FIG. 6B illustrates a second (blurred) frame usable to implement de-blurring of images according to some embodiments. A blurred frame 602 is provided.

Figure 6C:
FIG. 6C illustrates a static region map usable to implement de-blurring of images according to some embodiments.

FIG. 6C illustrates a static region map usable to implement de-blurring of images according to some embodiments. In the $\alpha$ map 604, also known as a static region map or static region measure, static regions with high $\alpha$ scores are portrayed as bright (white) and non-static regions with low $\alpha$ scores are portrayed as dark (black). Thus, embodiments insert pixels from white regions of sharp frame 600 into corresponding locations of blurred frame 602.

Figure 7A:
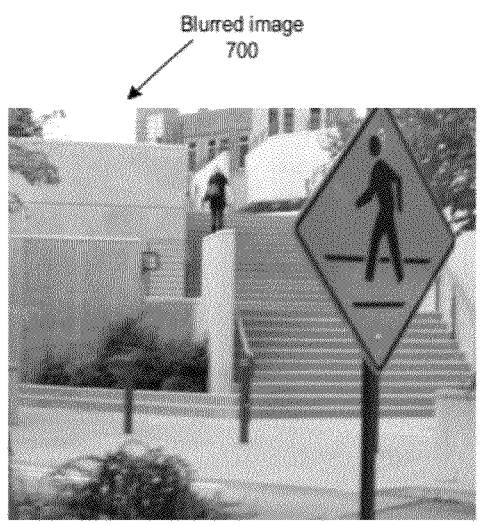
FIG. 7A illustrates a first (blurred) frame usable to implement de-blurring of images according to some embodiments.
Figure 8:
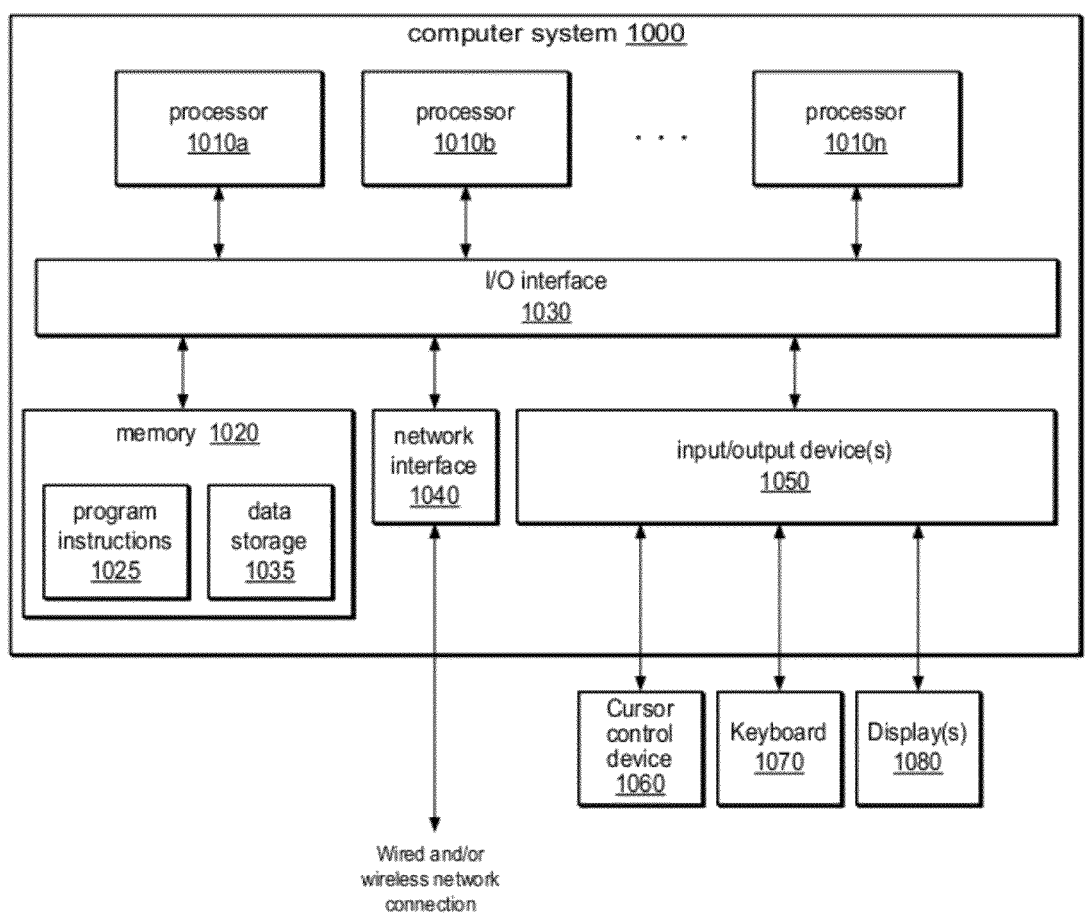
FIG. 8 illustrates an example computer system that may be used in embodiments.

FIG. 7A illustrates a first (blurred) frame usable to implement de-blurring of images according to some embodiments. Blurred image 700 is provided to give context for appreciating a result achieved by embodiments.

Figure 7B:
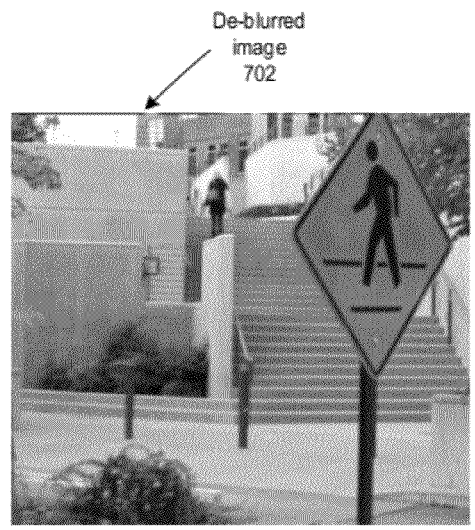
FIG. 7B illustrates a de-blurred frame resulting from de-blurring of images according to some embodiments.

FIG. 7B illustrates a de-blurred frame resulting from de-blurring of images according to some embodiments. Deblurred image 702 is provided to demonstrate a result achieved by embodiments.

Figure 7C:
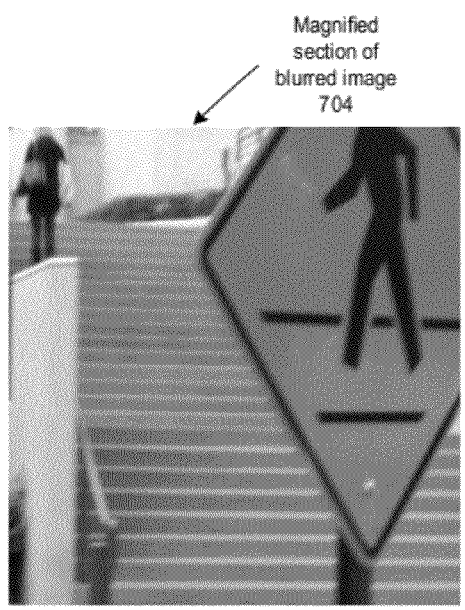
FIG. 7C illustrates a magnified section of a first (blurred) frame usable to implement de-blurring of images according to some embodiments.

FIG. 7C illustrates a magnified section of a first (blurred) frame usable to implement de-blurring of images according to some embodiments. Magnified section of blurred image 700 is provided to give context for appreciating a result achieved by embodiments.

Figure 7D:
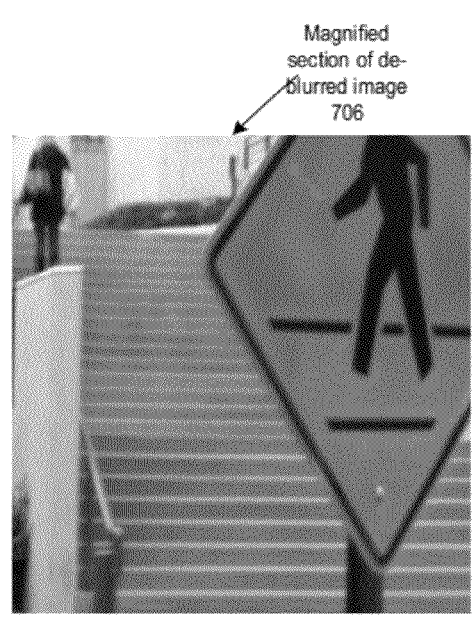
FIG. 7D illustrates a magnified section of a de-blurred frame resulting from de-blurring of images according to some embodiments.

FIG. 7D illustrates a magnified section of a de-blurred frame resulting from de-blurring of images according to some embodiments. Magnified section of deblurred image 706 is provided to demonstrate a result achieved by embodiments.

Example System

Embodiments of a de-blurring module and/or of the de-blurring image editing techniques as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a deblurring image editing module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of a deblurring image editing module as described herein, and data storage 1035, comprising various data accessible by program instructions 1025. In one embodiment, program instructions 1025 may include software elements of embodiments of a deblurring image editing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a deblurring image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   detecting a sharp frame and a blurred frame from among a plurality of frames;
   estimating a blur kernel, the blur kernel representing a motion-transform between one or more common regions of the sharp frame and the blurred frame;
   blurring the sharp frame using the blur kernel, and comparing the blurred sharp frame to the blurred frame to identify a static region measure for the sharp frame and the blurred frame; and
   generating a de-blurred frame by replacing one or more pixels of the blurred frame as indicated by the static region measure.

2. The method of claim 1, wherein the replacing the one or more pixels of the blurred frame as indicated by the static region measure further comprises:
   calculating a replacement pixel for one of the one or more pixels as a composite of a first pixel from the sharp frame and a second pixel from a second sharp frame, wherein the sharp frame is a frame occurring prior to the blurred frame in the video stream comprising the plurality of frames, and the second sharp frame is a frame occurring after the blurred frame in the video stream comprising the plurality of frames.

3. The method of claim 1, wherein the detecting the sharp frame further comprises
   detecting a set of feature points in a first frame;
   tracking the set of feature points in a second frame;
   calculating a motion of the set of feature points between the first frame and the second frame; and
   identifying the second frame as the sharp frame if the motion of the set of feature points between the first frame and the second frame is less than a threshold value.

4. The method of claim 3, wherein the calculating the motion of the set of feature points between the first frame and the second frame further comprises estimating a homography based on a displacement of the set of feature points between the first frame and the second frame, and wherein the blur kernel is estimated based on an alignment between the sharp frame and the blurred frame based on the homography.

5. The method of claim 3, wherein the identifying the static region measure further comprises calculating a value of the static region measure for a pixel location such that the value is inversely correlated to a change of a status of the pixel location.

6. The method of claim 1, wherein the identifying the static region measure further comprises calculating a value of an energy minimization function comprising a regularization term and a structural similarity term.

7. A system, comprising:
   one or more processors; and
   a memory coupled to the one or more processors, the memory comprising program instructions executable by the one or more processors to perform operations comprising:
   detecting a sharp frame and a blurred frame from among a plurality of frames;
   estimating a blur kernel, the blur kernel representing a motion-transform between one or more common regions of the sharp frame and the blurred frame;
   blurring the sharp frame using the blur kernel, and comparing the blurred sharp frame to the blurred frame to identify a static region measure for the sharp frame and the blurred frame; and
   generating a de-blurred frame by replacing one or more pixels of the blurred frame as indicated by the static region measure.

8. The system of claim 7, wherein the program instructions executable by the one or more processors to perform the replacing the one or more pixels of the blurred frame as indicated by the static region measure further comprise program instructions executable by the one or more processors to perform operations comprising: calculating a replacement pixel for one of the one or more pixels as a composite of a first pixel from the sharp frame and a second pixel from a second sharp frame, wherein the sharp frame is a frame occurring prior to the blurred frame in the video stream comprising the plurality of frames, and the second sharp frame is a frame occurring after the blurred frame in the video stream comprising the plurality of frames.

9. The system of claim 7, wherein the program instructions executable by the one or more processors to perform the detecting the sharp frame further comprise program instructions executable by the one or more processors to perform operations comprising:
   detecting a set of feature points in a first frame;
   tracking the set of feature points in a second frame;
   calculating a motion of the set of feature points between the first frame and the second frame; and
   identifying the second frame as the sharp frame if the motion of the set of feature points between the first frame and the second frame is less than a threshold value.

10. The system of claim 9, wherein the program instructions executable by the one or more processors to perform the calculating the motion of the set of feature points between the first frame and the second frame further comprise program instructions executable by the one or more processors to perform operations comprising estimating a homography based on a displacement of the set of feature points between the first frame and the second frame, and wherein the blur kernel is estimated based on an alignment between the sharp frame and the blurred frame based on the homography.

11. The system of claim 7, wherein the program instructions executable by the one or more processors to perform the identifying the static region measure further comprise program instructions executable by the one or more processors to perform operations comprising calculating a value of the static region measure for a pixel location such that the value is inversely correlated to a change of a status of the pixel location.

12. The system of claim 7, wherein the program instructions executable by the one or more processors to perform the identifying the static region measure further comprise program instructions executable by the one or more processors to perform operations comprising calculating a value of an energy minimization function comprising a regularization term and a structural similarity term.

13. A computer-readable storage device comprising program instructions stored thereon that, responsive to execution by a computer, perform operations comprising:
 detecting a sharp frame and a blurred frame from among a plurality of frames;
 estimating a blur kernel, the blur kernel representing a motion-transform between one or more common regions of the sharp frame and the blurred frame;
 blurring the sharp frame using the blur kernel, and comparing the blurred sharp frame to the blurred frame to identify a static region measure for the sharp frame and the blurred frame; and
 generating a de-blurred frame by replacing one or more pixels of the blurred frame as indicated by the static region measure.

14. The computer-readable storage device of claim 13, wherein the program instructions, responsive to execution by the computer, perform the replacing the one or more pixels of the blurred frame as indicated by the static region measure by calculating a replacement pixel for one of the one or more pixels as a composite of a first pixel from the sharp frame and a second pixel from a second sharp frame, wherein the sharp frame is a frame occurring prior to the blurred frame in the video stream comprising the plurality of frames, and the second sharp frame is a frame occurring after the blurred frame in the video stream comprising the plurality of frames.

15. The computer-readable storage device of claim 13, wherein the program instructions, responsive to execution by the computer, perform the detecting the sharp frame by:
 detecting a set of feature points in a first frame;
 tracking the set of feature points in a second frame;
 calculating a motion of the set of feature points between the first frame and the second frame; and
 identifying the second frame as the sharp frame if the motion of the set of feature points between the first frame and the second frame is less than a threshold value.

16. The computer-readable storage device of claim 15, wherein the program instructions, responsive to execution by the computer, perform the calculating the motion of the set of feature points between the first frame and the second frame by estimating a homography based on a displacement of the set of feature points between the first frame and the second frame, and wherein the blur kernel is estimated based on an alignment between the sharp frame and the blurred frame based on the homography.

17. The computer-readable storage device of claim 15, wherein the program instructions, responsive to execution by the computer, perform the identifying the static region measure by calculating a value of the static region measure for a pixel location such that the value is inversely correlated to a change of a status of the pixel location.

* * * * *